UNITED STATES PATENT OFFICE.

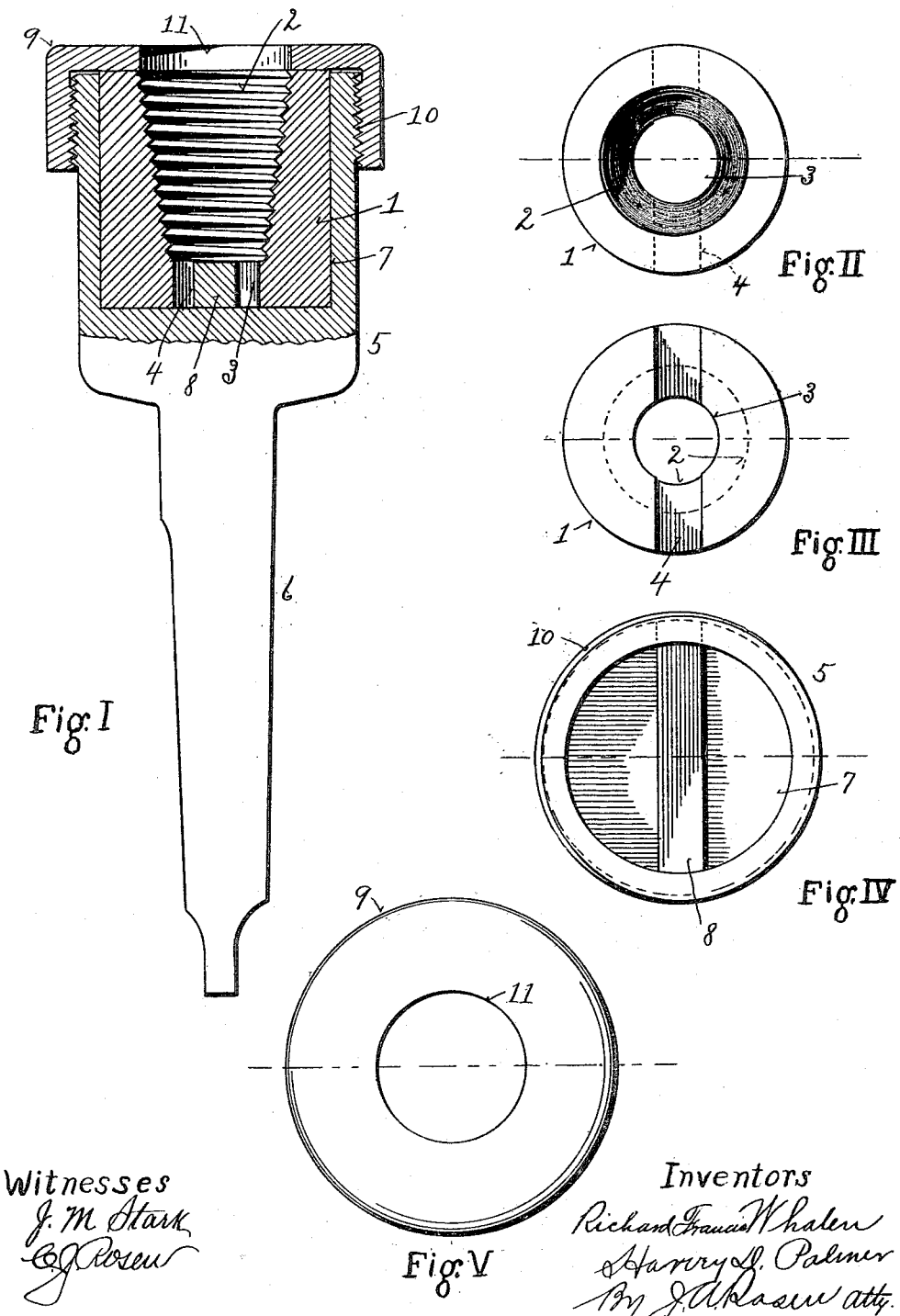

RICHARD FRANCIS WHALEN AND HARVEY D. PALMER, OF TOPEKA, KANSAS.

STAY-BOLT CHUCK.

1,127,836.  Specification of Letters Patent.  Patented Feb. 9, 1915.

Application filed August 28, 1913. Serial No. 787,089.

*To all whom it may concern:*

Be it known that we, RICHARD FRANCIS WHALEN and HARVEY D. PALMER, citizens of the United States, residing at Topeka, in the county of Shawnee and State of Kansas, have invented certain new and useful Improvements in Stay-Bolt Chucks, of which the following is a specification.

Our invention is a device to facilitate the running in or screwing in of stay-bolts and other work of similar general nature. Owing to the great number of stay-bolts used in locomotive work, it is a matter of economy to provide means for rapidly screwing in each stay-bolt and as well to grip and release each stay-bolt so that the means employed may be quickly moved from stay-bolt to stay-bolt and thus be kept as nearly constantly as possible to its real work, the screwing in of the stay-bolts.

It is the object of our invention to provide for quickly gripping the stay-bolt and for quickly releasing it, also to grip it securely so that the motor employed may screw it in rapidly and firmly; to provide a self-centering chuck that may be quickly applied to and released from the stay-bolt; to provide such a chuck that can be used upon various sizes (as to diameters) of stay-bolts; to provide a convenient casing for such chuck; to provide a casing suitable for holding chucks of various sizes, each chuck being self-centering, and each chuck being itself adapted to a wide range of work; and to provide the parts, improvements, and combinations hereinafter set forth.

Our invention comprises as its main feature a chuck having a screw-threaded tapered opening for gripping the work; it also comprises a special casing for holding the chuck; and it also comprises the combination of the chuck and the casing, and as well the parts, improvements, and combinations hereinafter set forth and claimed.

In the drawings accompanying and forming part of this specification and in the description of the drawings we have shown our invention in its preferred form and what we deem to be the best mode of applying the principles thereof; but it is to be understood that within the scope of the appended claims we contemplate changes in form, proportions, and materials, the transposition of parts, and the substitution of equivalent members, without departing from the spirit of our invention.

Figure I is a central longitudinal sectional elevation of a chuck and casing made in accordance with our invention. Fig. II is a view of the outer end of the chuck proper removed from the casing. Fig. III is a view of the inner end. Fig. IV is a view looking in from the outer end of the casing, the chuck proper and the screw cap being removed. Fig. V is a plan view of the cap.

Similar reference characters indicate like or corresponding parts throughout the several views.

1 is the chuck proper having the screw-threaded tapered opening 2, which opening, as a matter of convenience in manufacture, may extend on through the body of the chuck as indicated at 3. The end of the chuck having the smaller end of the tapered opening is formed with a transverse slot 4 for a purpose presently described.

5 is the casing having a stem or shank 6 whereby it may be applied to the sleeve or hollow spindle of any suitable motor. The casing is formed with a socket 7 for receiving the chuck and with a transverse bar or key 8 which engages in the slot 4 for the purpose of preventing rotary movement of the chuck with relation to the casing. A cap 9 fits over the end of the casing, and has screw-threaded engagement with the casing, as indicated at 10. The chuck is preferably slightly longer than the socket so that it projects slightly from the end of the casing, so that the cap is free to clamp the chuck firmly between the socket and the cap when the cap is screwed down firmly. The cap is formed with a central opening 11 registering with the screw-threaded tapered opening of the chuck for the purpose of admitting the work thereto, and this opening should correspond with, or be larger than, the outer and larger end of the tapered opening. Obviously the screw-threading in the tapered opening should be in conformity with the direction of the rotation of the chuck. Preferably this threading is rather coarse, and the chuck proper is made of tool steel, while the casing may be made of any suitable quality or kind of material. The transverse bar or key 8 is secured permanently in position by driving it through holes in the side walls of the case, so that it becomes integral with the casing, and is not loose or detachable.

The usual method of operating our device is, by means of a suitable driving mechanism, preferably a portable motor. The stay-bolt being placed in position by screwing it in a few threads to hold it in proper place, is gripped by the chuck by moving the chuck and motor to the outer end of the stay-bolt and applying the chuck thereto. The chuck is pressed onto the end of the stay-bolt, the threading of the chuck cuts a corresponding threading upon the end of the stay-bolt for a distance of two or three threads, more or less, depending of course upon the resistance encountered by the stay-bolt, thus affording the chuck a threaded engaging grip upon the end of the stay-bolt, the continued rotation of the chuck screws in the stay-bolt, and when properly screwed in, the chuck is reversed by reversing the motor and instantly releases its grip upon the stay-bolt. A given chuck may be applied to any work fitting within the maximum and minimum diameters of the tapered opening.

It will be noted that the chuck is automatically centered when applied to the work, and that as the resistance increases the grip becomes broader and stronger. It will also be now understood that the chuck when used with a suitable portable motor greatly facilitates the class of work to which it is applicable. Thus, in running in stay-bolts, if a large number of the stay-bolts be set in place by screwing each one in just enough to hold it, our device may be quickly applied to each stay-bolt to grip it, screw it in, and release it; the continuous operation being to start the motor, apply the chuck to a stay-bolt, reverse the motor twice and apply the chuck to the next stay-bolt, etc. If any stay-bolt should not release upon reversing the motor, it is too loose and should be removed; but the chuck will not fail to release unless the bolt is very loose. When a chuck is worn out it may be easily and quickly replaced. So, too, it is an easy matter to change chucks for different classes of work.

We lay special emphasis upon the application of our invention to stay-bolt work because of its special adaptability to that class of work as herein illustrated; but of course we do not limit its use or application to stay-bolt work.

What we claim is:

1. The combination of a stay-bolt chuck having an axially extending screw-threaded tapered opening for gripping the work and having a transverse slot in one end, a casing formed for attachment to a motor and having a socket for the reception of said chuck and a transverse bar in the bottom of the socket for engaging in the slot, said bar being permanently secured to the casing, and a cap fitting on the end of the casing and having screw-threaded engagement with the casing and clamping the chuck in the socket with the bar engaged in the slot and also having a central opening concentric with the chuck's tapered opening for admitting the work thereto.

2. The process of fastening stay-bolts in place which consists in screwing a metal bolt into its mating part by gripping the bolt-head with a turning pressure applied along a conical spiral line, simultaneously with the application of the turning pressure cutting into said head along said line to increase the turning pressure to overcome the resistance offered to the turning of the bolt and then releasing said turning pressure by reversing the direction of its application.

3. The process of applying and removing stay-bolts which consists in turning a screw-threaded bolt in its mating part by gripping the bolt-head with a turning pressure applied along a conical spiral line, simultaneously with the application of the turning pressure cutting into said head along said line to increase the turning pressure to overcome the resistance offered to the turning of the bolt, and then releasing said turning pressure by a relative reversal of the direction of its application.

In testimony whereof we have affixed our signatures in presence of two witnesses.

RICHARD FRANCIS WHALEN.
HARVEY D. PALMER.

Witnesses:
C. J. ROSEN,
J. M. STARK.

Copies of this patent may be obtained for five cents each, by addressing the "Commissioner of Patents, Washington, D. C."